United States Patent
Narayanaswami et al.

(10) Patent No.: US 7,568,007 B2
(45) Date of Patent: Jul. 28, 2009

(54) SYSTEM AND METHOD FOR SUPPORTING INSTANT MESSAGING IN DISCONNECTED MODES

(75) Inventors: Chandra Narayanaswami, Wilton, CT (US); Claus M. Olsen, Cortlandt Manor, NY (US); Guruduth Banavar, Pelham Manor, NY (US); Lorraine M. Herger, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 10/953,908

(22) Filed: Sep. 29, 2004

(65) Prior Publication Data
US 2006/0075039 A1   Apr. 6, 2006

(51) Int. Cl.
G06F 15/16 (2006.01)
(52) U.S. Cl. .................. 709/206; 709/205; 709/207
(58) Field of Classification Search ............. 709/204, 709/206, 207
See application file for complete search history.

(56) References Cited

U.S. PATENT DOCUMENTS

| | | | | |
|---|---|---|---|---|
| 6,298,373 | B1 * | 10/2001 | Burns et al. ............. | 709/203 |
| 6,301,609 | B1 * | 10/2001 | Aravamudan et al. ...... | 709/207 |
| 6,381,633 | B2 * | 4/2002 | Chang et al. ............ | 709/206 |
| 6,430,604 | B1 | 8/2002 | Ogle et al. | |
| 6,457,879 | B1 * | 10/2002 | Thurlow et al. .......... | 709/206 |
| 6,556,666 | B1 * | 4/2003 | Beyda et al. ............ | 379/88.12 |
| 6,731,308 | B1 | 5/2004 | Tang et al. | |
| 6,757,365 | B1 * | 6/2004 | Bogard ................... | 379/88.17 |
| 6,912,564 | B1 * | 6/2005 | Appelman et al. ........ | 709/204 |
| 7,120,672 | B1 * | 10/2006 | Szeto et al. ............ | 709/206 |
| 7,130,885 | B2 * | 10/2006 | Chandra et al. .......... | 709/206 |
| 7,206,813 | B2 * | 4/2007 | Dunbar et al. ........... | 709/206 |
| 7,225,226 | B2 * | 5/2007 | Fitzpatrick et al. ...... | 709/205 |
| 7,283,805 | B2 * | 10/2007 | Agrawal ................. | 455/412.2 |
| 7,295,657 | B1 * | 11/2007 | Keohane et al. ......... | 379/88.23 |
| 7,328,242 | B1 * | 2/2008 | McCarthy et al. ........ | 709/204 |
| 7,337,210 | B2 * | 2/2008 | Barsness ................ | 709/207 |
| 2002/0007398 | A1 * | 1/2002 | Mendiola et al. ........ | 709/206 |
| 2002/0035605 | A1 * | 3/2002 | McDowell et al. ....... | 709/206 |
| 2002/0065894 | A1 * | 5/2002 | Dalal et al. ............ | 709/206 |
| 2002/0083127 | A1 * | 6/2002 | Agrawal ................. | 709/203 |

(Continued)

Primary Examiner—Michael Won
(74) Attorney, Agent, or Firm—Scully, Scott, Murphy & Presser, P.C.; Vazken Alexanian

(57) ABSTRACT

A method, system, and computer program for a) buffering instant messages to an intended recipient while the recipient is currently not logged on to an instant messaging system, and b) delivering buffered messages to the intended recipient after the recipient connects the instant messaging system. Thus, users are enabled to initiate instant messaging sessions with other users who are not currently online. An instant messaging device buffers messages and delivers them to the recipient when the recipient comes online. To the recipient, the method of delivery appears identical to the case where the recipient was continuously connected to the system. The main difference is the time delay, i.e. the elapsed time between the time the sender sent it and the time the recipient connected. The recipient is further able to configure the instant messaging device to be selective about which senders are allowed to buffer messages to the recipient while the recipient is disconnected. Sender specific pop-up windows, including the sender's buffered messages, will appear on the recipient's screen after the recipient connects to the system. The recipient can then respond to the instant message and resume the conversation in a real-time (though delayed) manner if the sender is presently online.

26 Claims, 8 Drawing Sheets

U.S. PATENT DOCUMENTS

| | | |
|---|---|---|
| 2002/0103917 A1 | 8/2002 | Kay et al. |
| 2003/0023691 A1* | 1/2003 | Knauerhase ................ 709/206 |
| 2003/0225848 A1* | 12/2003 | Heikes et al. ............... 709/207 |
| 2004/0078447 A1* | 4/2004 | Malik et al. ................ 709/206 |
| 2004/0117443 A1* | 6/2004 | Barsness .................... 709/204 |
| 2004/0215730 A1* | 10/2004 | Hamilton et al. ........... 709/207 |
| 2004/0267884 A1* | 12/2004 | Sar-Shalom ................ 709/206 |
| 2006/0168037 A1* | 7/2006 | Audu et al. ................. 709/206 |
| 2007/0130277 A1* | 6/2007 | Roskind et al. ............. 709/207 |

* cited by examiner

FIG. 6
ALICE'S PREFERENCES FOR BUFFERED MESSAGES

| SENDER NAME | BUFFERING ALLOWED? | BUFFERING QUOTA | BUFFERED MSG DELIVERY TIMES |
|---|---|---|---|
| BOB | YES | 20 MSGS 604 | 9AM-6PM |
| CHARLIE | NO | 0 | NA |
| SUZY | YES | 2MB 606 | ANYTIME |
| CHET | YES | 20 MB BETWEEN 8AM-5PM; 2MB 5PM-8AM | ANYTIME |
| KATY | YES | 4MB | 6PM-6AM |

CHOICES FOR ALICE'S LOCATION TAB FROM CALENDAR AND OTHER INFORMATION

ALICE'S ACCESS CONTROL LIST FOR WHAT
INFORMATION RECIPIENTS CAN SEE

| NAME | CALENDAR ACCESS | PHYSICAL ACTIVITY ACCESS | LOCATION | WHEN NEXT AVAIL | ROLL TO CELL PHONE? |
|---|---|---|---|---|---|
| BOB | Y | N | Y | Y | Y |
| CHARLIE | N | Y | Y | Y | N |
| KATY | Y | N | Y | N | N |
| SUZY | N | Y | Y | Y | N |

SYSTEM AND METHOD FOR SUPPORTING INSTANT MESSAGING IN DISCONNECTED MODES

BACKGROUND OF THE INVENTION

1. Field of the Invention

This invention presents novel features for communications system providing Instant Messaging (IM) services, and more particularly, to additional novel features for supporting IM functionality in disconnected modes.

2. Description of the Prior Art

IM is a type of communications service that enables real-time communication between two parties over the Internet ("online"). Via the IM service, two or more individuals may engage in a real-time conversation using text-based communication.

For instance, two individuals employing systems having the same IM client software may type messages back in forth in a private chat room-type setting. Typically, the IM system alerts a user whenever a person on that user's private list ("buddy" list) is online. The user may then initiate a chat session with that particular individual. Common IM services are provided by AOL Instant Messager and MSN Messenger.

Instant Messaging has proved itself to be a compelling communication tool and has changed the way business is conducted. One limitation with most IM systems, however, is that it is not possible to communicate in a rich way with people who are not presently online. In these situations, users end up using email or adding to a message catalog to touch base with people who are not online or wait until the person comes online. By using email or equivalent methods, the advantages of real-time communication that makes instant messaging popular are lost. The problem with having to wait for the person to come back online is that the train of thought that initiated the need for communication may be lost in the meanwhile.

Currently, Yahoo's IM service allows messages to be buffered. However, all messages are catalogued into one interface. That is, any message received for a person who is not online will be able to see the message when that person logs in again. However, the recipient will only get one window displaying all messages sent while the recipient was offline and messages from all senders are placed and are shown in the same window. The user may select one message item from the window and respond. Each line (when selected) from a sender is considered a different message. There is no window per user and this makes it difficult to respond to the person who sent the buffered message. Thus, in this prior art system, there is no user selective buffering and recipients have no way of indicating that they do not want buffered messages. Furthermore, buffered messages are shown only for one login session. Thus, if the recipient logs in and does not respond to all of the buffered messages in one session and then logs out of the IM system, the recipient loses the buffered messages.

U.S. Pat. No. 6,430,604 to International Business Machines, Inc. is directed to a method, system, and computer program product for enabling messaging systems to use alternative message delivery mechanisms. Because in existing IM systems, messages cannot be delivered to an intended recipient unless the recipient is currently logged on to an IM system, this prior art patent enables users to register one or more alternative message delivery mechanisms (such as pagers, cell phones, etc.) through which they are available as an alternative to an instant messaging system. Thus, in one embodiment described in U.S. Pat. No. 6,430,604, an extended IM system will select a suitable alternative and deliver the message. For example, IBM "NotesBuddy" permits a message to be converted to email and sent to the recipient if the recipient is not currently online. In other embodiments, the sender of the "instant" message will be informed of the available alternative(s) and may then choose to have his message delivered even though the intended receiver is not currently logged on to an IM system. Still other embodiments enable a message to be delivered to a recipient using a registered mechanism (that may include an IM service), and provide for determining availability of a selected user. Using these techniques, the real-time awareness of potential message receivers in IM systems is extended.

Further U.S. Pat. No. 6,731,308 to Sun Microsystems, Inc., is directed to a method and system for providing distributed parties reciprocal information regarding each other's activities that is adapted for use with instant messaging. For example, selected information regarding the availability of an intended recipient to engage in a communication session with an initiator may be provided, and the system disclosed may reciprocally inform the intended recipient of the initiator's access to such information. Further, the system described can provide a signal to an intended recipient to indicate an initiator's intention to establish a communication session.

None of these prior art messaging systems provide an IM service that enhance the user experience and IM capabilities while communicating in disconnected modes and while retrieving and responding to buffered messages. Nor do these prior art messaging systems provide the buffering at the server and maintain the context at the server and client needed to enhance the user experience and capabilities.

SUMMARY OF THE INVENTION

It is thus an object of the present invention to provide functionality for an IM system that includes features for enhancing the user experience and capabilities in the context of disconnected modes.

In accordance with the present invention, users are enabled to initiate IM sessions with other users who are not currently online. An IM server would buffer the messages and deliver them to the recipient when the recipient comes online. To the recipient, the method of delivery appears identical to the case where he or she was continuously connected. The only difference is the time delay—the delay being the elapsed time between the time the sender sent it and the time the recipient just connected. That is, windows specific to each sender appear on the recipient's screen. The recipient can then respond to the message and resume the conversation in a real-time (though delayed) manner if the sender is presently online. If the sender is not presently online and allows his/her messages to be buffered the recipient's reply can be buffered and delivered to the sender when the sender connects to the IM server again.

According to this aspect of the invention there is provided a system and method for enhancing the user experience and IM capabilities while communicating in disconnected modes and while retrieving and responding to buffered messages. The system and method for enhancing the user experience and IM capabilities while communicating in disconnected modes and while retrieving and responding to buffered messages comprises:

a) receiving at a computing device at least one message sent by a first party, the at least one message destined for a second party;

b) determining connection status of the second party with the IM system;

c) if determination is that the second party is disconnected from the IM system, the step of buffering the first party's at least one message for the second party; and, d) notifying the second party of availability of the buffered at least one message after the second party becomes connected to the IM system; and, providing a chat interface on second party's computing device, the chat interface being specific to said first party and the chat interface including the buffered at least one message received from the first party.

e) receiving at a computing device at least one message sent by a first party, the at least one message destined for a second party;

f) determining connection status of the second party with the IM system;

g) if determination is that the second party is disconnected from the IM system, the step of buffering the first party's at least one message for the second party; and, h) notifying the second party of availability of the buffered at least one message after the second party becomes connected to the IM system; and, providing a chat interface on second party's computing device, the chat interface being specific to said first party and the chat interface including the buffered at least one message received from the first party.

Another advantageous functionality of the system and method of the invention that enables instant messaging in disconnected mode is that the context for the conversation is already established, and the need to open an e-mail message or find the e-mail address for the partner is obviated. The user just starts to type in the appropriate window and commences the IM chat in a real-time, but delayed, manner. Yet another advantageous functionality of the system and method of the invention is that a disconnected user can initiate an IM session with a recipient. Further functionality of the system and method of the invention is that when a user becomes disconnected from the server, e.g., if the user experiences a network level disconnect, that the user doesn't have to log back in when he reconnects to the network.

BRIEF DESCRIPTION OF THE DRAWINGS

Further features, aspects and advantages of the structures and methods of the present invention will become better understood with regard to the following description, appended claims, and accompanying drawings where:

FIG. 6 illustrates example IM preference criteria that is indicated by users of the IM system of the invention;

DETAILED DESCRIPTION OF THE PREFERRED EMBODIMENTS

The present invention provides a solution that enables users to initiate IM sessions with users who are in disconnected modes. As will be referred to herein, a "real-time" IM pop-up window is defined as a window that appears near-instantaneously on a recipient's computer screen in response to a sender entering the very first message to the recipient.

As will be described in greater detail, an IM server includes a memory storage device that buffers the received messages and delivers the messages to the target recipient when the recipient comes online. To the recipient, the method of delivery appears identical to the case where the recipient was continuously connected. The only difference is the time delay—the delay being the elapsed time between the time the sender sent the message, and the time the recipient just connected to the IM server. That is, the system presents a display interface at the recipient's client device, e.g., a personal computer, specific to the sender. In one embodiment, the display interface appearing on the recipient's display screen is an IM pop-up window on a graphical user interface desktop. The recipient can then respond to the message and resume the conversation in a real-time (though delayed) manner if the sender is presently online. If the sender is not presently online, and allows his/her messages to be buffered, the recipient's reply can be buffered and delivered to the sender when the sender connects to the IM server again.

Figure 1:
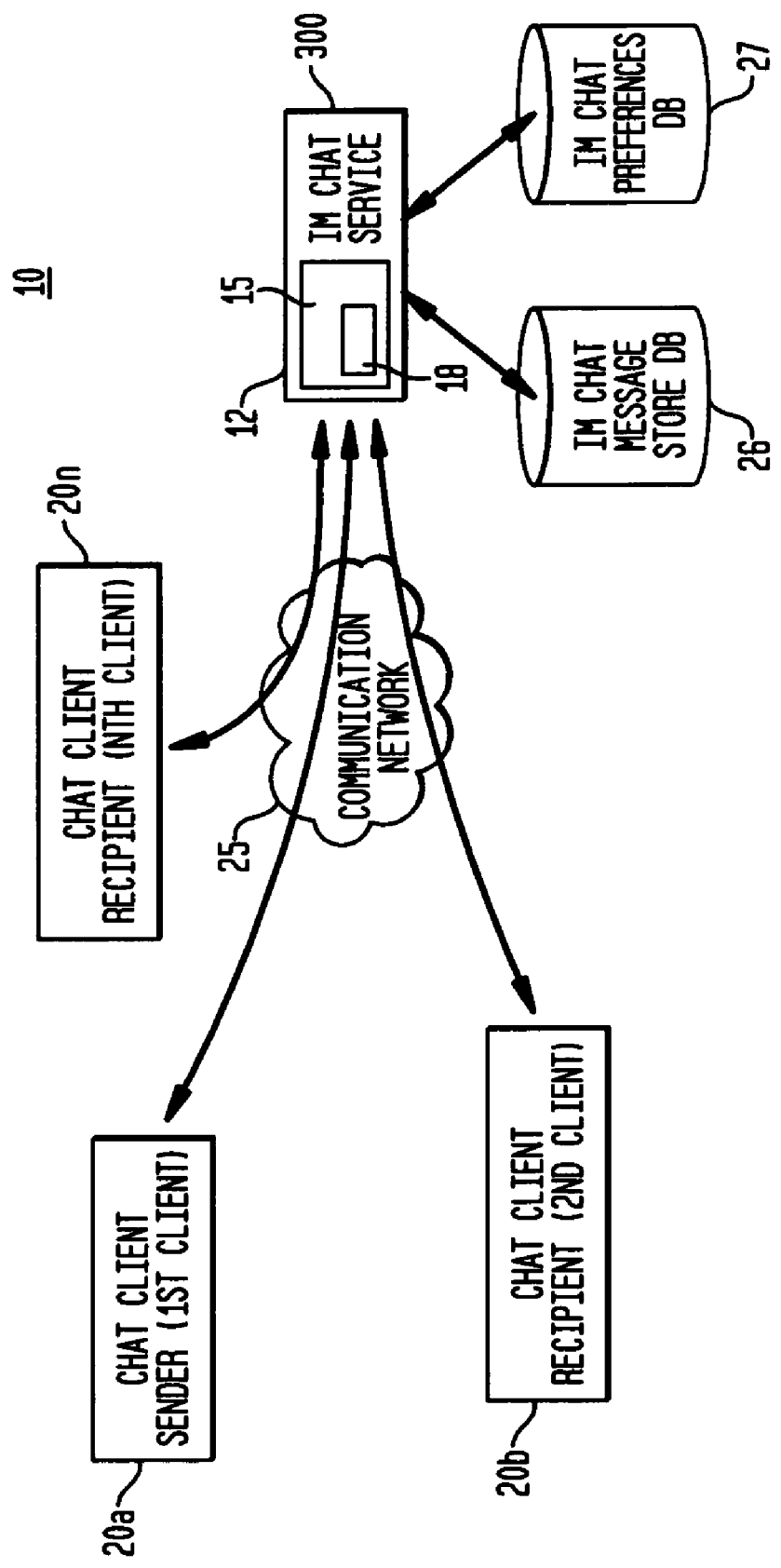
FIG. 1 illustrates a block diagram of a system 10 for supporting instant messaging in disconnected mode.

FIG. 1 illustrates a block diagram of a system 10 for supporting instant messaging in disconnected modes. The system 10 comprises an IM chat service provider 12 including a web-server device 15 comprising IM processing and signal router functionality. The IM web-server device 15 is coupled to a data network 25 such as a local or wide area network(s). The invention is implemented for use with IM systems in an Internet environment, however alternatively, the environment may be a corporate intranet, an extranet, or any other network environment. The data processing network 25 may include a plurality of individual networks, such as wireless network and wired networks, each of which may include a plurality of individual workstations or like data processing devices. The IM web-server device 15, may be remotely located, and comprises one of any number of different types of computer devices that have message processing and message routing capabilities. These techniques are well known in the art, and the hardware devices and software which enable their use are readily available. Further provided as part of the IM system supporting disconnected modes in accordance with the invention, is the provision of memory storage devices 26, 27, e.g., comprising a database, hard disk memory storage, CD-ROM, RAM, memory, etc., that serves as the repository for stored, buffered messages, and user profile preferences. That is, in the manner as will be explained in greater detail herein, the storage device 26 may be implemented to simply store buffered messages for user clients and, the storage device 27 may be implemented to simply store user profile data, such as user preferences dictating the amounts of storage and times for storing messages for that user, and access control lists for determining whether an intended recipient has indicated a preference to reveal to a sender/requester the disconnect status of that disconnected recipient as will be explained in greater detail herein. It is understood that both storage devices 26. 27 may be implemented as a single storage database.

As shown in FIG. 1, several end-user client devices 20a, 20b, . . . , 20n that are enabled with an IM software application may be connected to the IM web-server device 15 via the Internet or network connection using a wired connection, or a wireless connection. Wired connections are those that use physical media such as cables and telephone lines, whereas wireless connections use media such as satellite links, radio frequency waves, and infrared waves. It is understood that many connection techniques can be used with these various media, for example, using a cellular modem to establish a wireless connection. Particularly, the end-user's client device 20a, 20b, . . . , 20n may be any type of computer processor, including laptop, handheld or mobile computers; vehicle-mounted devices; desktop computers; mainframe computers; etc., having processing and communication capabilities. Each of these end-users may log in as a user of an IM service provider 12 through an appropriate IM application or routine. Although not shown, a user 20a, 20b may be connected to the network 25 and the IM service provider 15 through an IM gateway device using an IM protocol. The IM gateway will typically be provided by an IM service provider 15 to which the user has subscribed and allows access to the IM system after the user has logged in. The IM application between message processor 12 and the network 25 is configured to enable access to one or more appropriate IM service provider (s).

Software programming code which embodies the IM service supporting disconnected modes according to the present invention is typically executed by a message processor 18 of the server 15. The software programming code may be embodied on any of a variety of known media for use with a data processing system, such as a diskette, hard drive, or CD-ROM. The code may be distributed on such media, or may be distributed to end-user clients from the memory or storage of one computer system over the network 25 to the client computer devices 20a, 20b, . . . , 20n for use by users of such systems. The techniques and methods for embodying software programming code in memory, on physical media, and/or distributing software code via networks are well known and will not be further discussed herein.

It is understood that in other embodiments, the present invention may be implemented as one or more modules (also referred to as code subroutines, or "objects" in object-oriented programming) of a computer software program (or programs) that provides instant messaging capabilities. The program code of the preferred embodiment may be implemented as objects in an object-oriented programming language, or in a conventional procedurally-oriented language, or in a mix of object-oriented and procedural language code. In one embodiment, the code of the present invention operates on the server.

Figure 2:
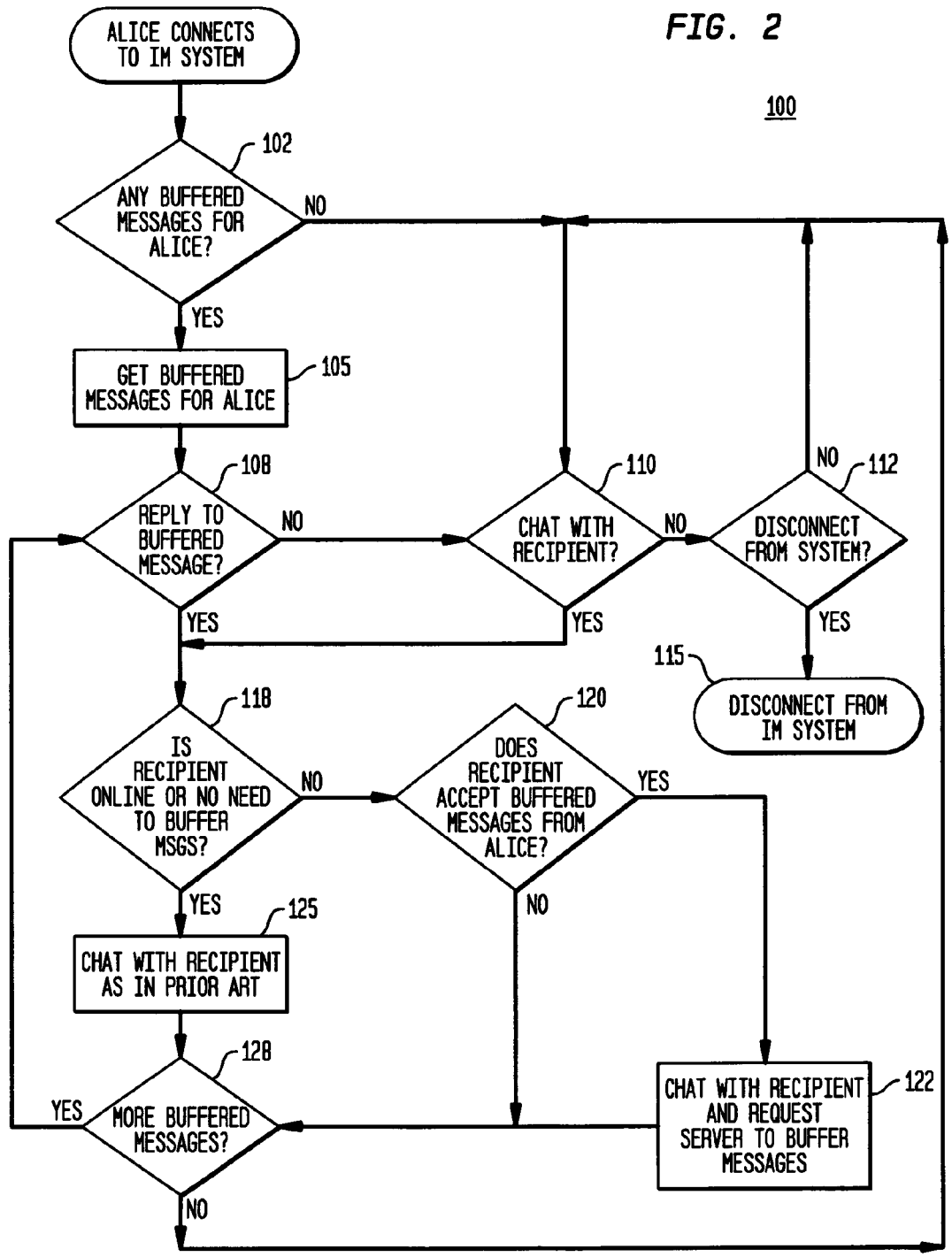
FIG. 2 illustrates the methodology 100 employed by a client application that is enabled with IM functionality in disconnected modes according to the invention.

FIG. 2 illustrates the methodology employed 100 by a client application that is enabled with IM functionality in disconnected modes according to the invention. As shown at step 102, after a first user, e.g., Alice, connects to the IM system via IM service provider 12 and logs on, the system first checks if there is any messages that have been buffered for her. In one embodiment, buffered messages may appear on the user device screen shown in a different color and font, or combination thereof, to indicate that a received message was buffered. If messages have been buffered, the user (Alice) may retrieve any buffered messages at step 105. According to the preferred embodiment, a buffer generated pop-up window is displayed for retrieving the buffered message that the recipient (Alice) would have received had she been connected at the time the sender sent the message. From an appearance perspective, the buffer generated IM pop-up window is quite similar to a real-time IM pop-up window as will be described in greater detail herein with respect to FIG. 9. Alice may then start to type a message in the buffer generated pop-up window. In this manner, the IM system appears the same except for the timeline. Thus, unlike prior art IM systems such as provided by Yahoo, the present invention performs a "selective buffering" such that there is a window per user that will pop up when the recipient subsequently goes online.

Continuing to step 108 in FIG. 2, after retrieving any buffered message, the recipient (Alice) may further execute an option of replying to the sender of the buffered message in the pop-up window. If no messages have been buffered (step 102), or, if after retrieving buffered IM messages (step 108), the user chooses not to reply to the sender(s) of a buffered message(s), the user may or may not choose to terminate any IM session with any sender of buffered message(s) (not shown in FIG. 2) or, the user may decide to keep any IM session with any sender of buffered message(s) alive for later use. In either case, the user can initiate a new IM chat with another recipient in step 110 in FIG. 2. In case the user attempts to establish a new chat session with a sender with which the user already has a pop-up window open, the user will automatically be redirected to the already existing pop-up window, even if it is a buffer generated window. If the user does not want to initiate an IM chat with another recipient at step 110, the user may choose to disconnect from the system as indicated at step 112, at which time the user may exit the IM at step 115, or remain "on-line" with the IM application. If, at step 110, the user Alice does want to initiate an IM chat with another recipient, the process proceeds to next step 118 where functionality is initiated to determine whether the intended recipient is on-line or if there is a need to buffer a message from user Alice to that recipient as will be described. Returning back to step 108, similarly, if the user (Alice) chooses to reply to a buffered message, functionality is initiated at step 118 to determine whether the sender of the buffered message is on-line or, if there is a need to further buffer a reply message from the user (Alice) to that sender. Continuing at step 118, if the intended recipient is not on-line, then the process proceeds to step 120 where a decision is made as to whether the recipient has previously indicated acceptance to receive buffered messages from the user (Alice). If, at step 120, it is determined that the recipient accepts buffered messages from the user, then at step 122, the IM server is requested to buffer chat messages for later retrieval by the intended recipient and the user then the process proceeds to step 128 where a determination is made as to whether there are any more buffered messages for that user (e.g., Alice). Otherwise, at step 120, if it is determined that the recipient does not accept buffered messages from the user (Alice), or that the system can not buffer any message due to various criteria that is not met, then the process proceeds to step 128 where a determination is made as to whether there are any more buffered messages for that user (e.g., Alice). If there are more buffered messages to be received by the user, then the process returns to step 108 so that the user can decide whether to respond to the buffered message. Referring back at step 118, if it is determined that the sender of the buffered message is on-line or, if there is no need to further buffer a reply message from the user (Alice) to that sender, then the user Alice may chat with the recipient as indicated at step 125. After the chat with the recipient, whether in connected mode (step 125) or, in disconnected mode (steps 120, 122) where the messages are buffered, the system may check whether any more messages are buffered at step 128. If no other messages are buffered, the process remains on-line with the IM application. If other messages are buffered, the process returns to step 108 to provide the option for user Alice to reply to a further buffered message(s).

Figures 8, 9:
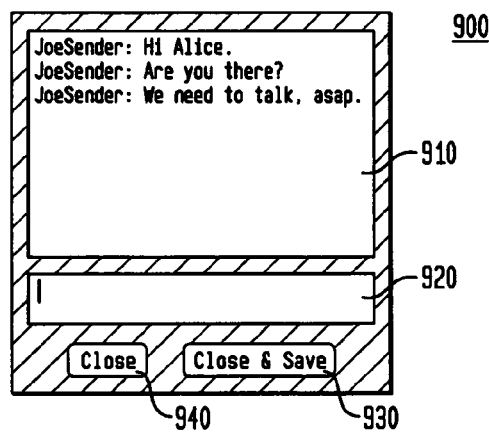
FIG. 8 illustrates an example IM access control list 800 describing what user disconnect status information recipients can see according to the IM system supporting disconnected modes according to the invention; and, FIG. 9 illustrates an exemplary IM pop-up window suitable for retrieving and responding to buffered messages.

From an appearance perspective, the buffer generated IM pop-up window is similar to a real-time IM pop-up window. However as shown in FIG. 9, the buffer generated pop-up window 900 will indicate all the senders' buffered messages at once in the conversation field 910 (in this case three buffered messages from JoeSender). In contrast, an real-time generated pop-up window will initially only show the sender's very first message. Secondly, the pop-up window 900 includes a "Close & Save" option 930 which terminates the IM session with the sender but saves all messages, including the buffered messages, so that the next time the user IM's the sender, or receives an IM from the sender, the previous IM session context is initially restored and replayed in the IM pop-up window. The pop-up window 900 also has the usual "Close" option 940, which terminates the IM session with the sender and discards all exchanged messages. Field 920 is the user input field where, e.g., Alice, enters messages to Joe-Sender. Alice's messages, once entered, will in turn appear in the conversation field 910.

Figure 3:
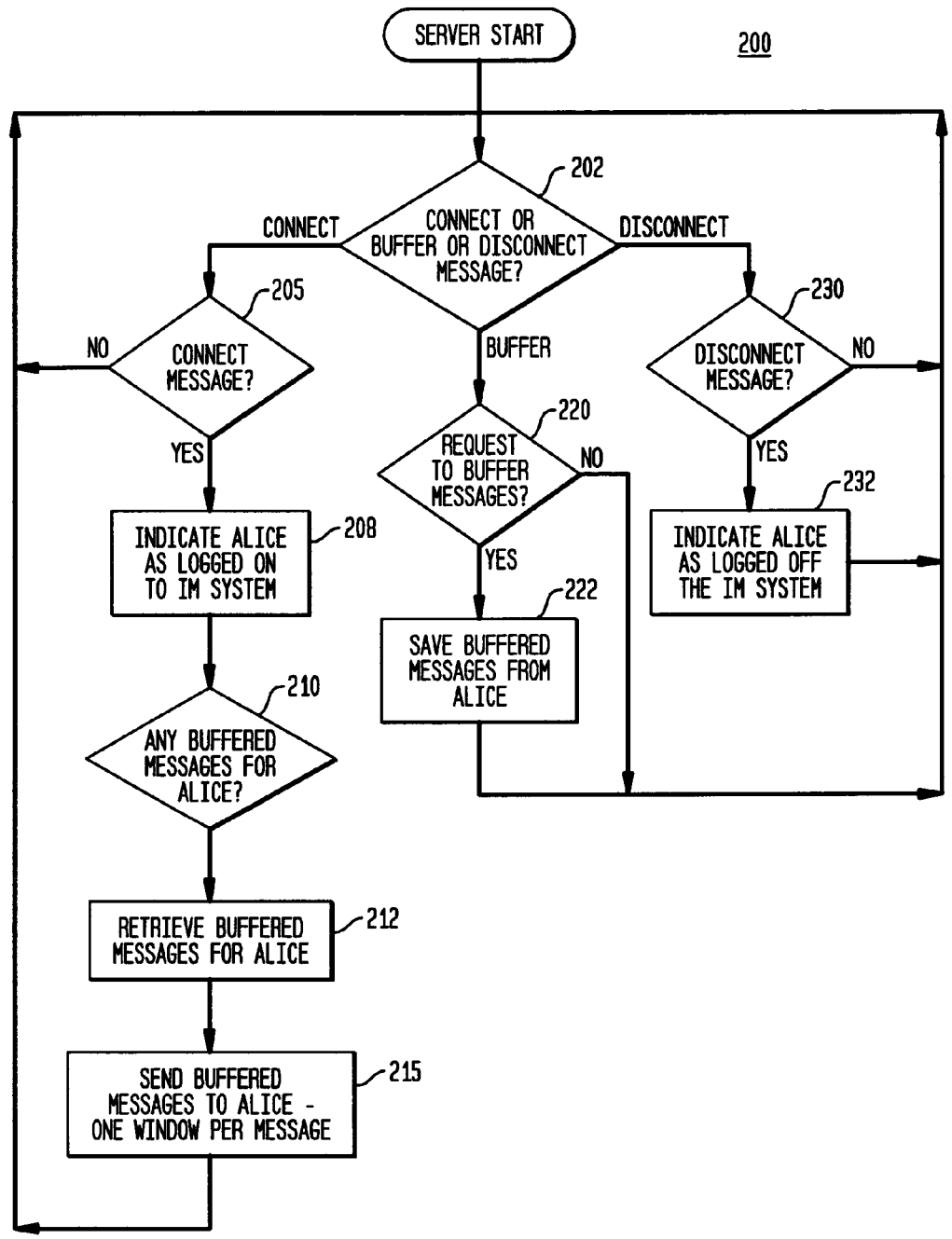
FIG. 3 illustrates the methodology 200 employed by the IM server application providing IM functionality in disconnected modes according to the invention.

The IM server application 200 providing IM functionality in disconnected mode is now described in detail with respect to FIG. 3. As shown at a first step 202, the server awaits for a command from the client application (e.g., first user Alice as shown in FIG. 2). As shown at step 202, the commands may include: a request to connect an IM user, a request to buffer a message to a disconnected recipient, or, a request to disconnect a user from the IM system. Continuing to step 205, if the received request is a request to connect an IM user, a determination is made as to whether the received request is to connect a user into the system. If a user is not to be connected, then the process returns to step 202 to either process a message to be buffered (step 220) or, take other action such as disconnecting the user from the IM system (step 230). If a user is to be connected at step 205, then the process proceeds to step 208 where the system indicates the IM message sender, e.g., Alice, as being logged on to the IM system application. The IM server then checks at step 210 if there are any messages that have been buffered for Alice. If messages have been buffered, the user Alice may retrieve any buffered messages at step 212 and the IM server application, implementing functionality according to the invention, communicates the buffered message to Alice at step 215 for viewing via a display interface at Alice's IM client device, e.g., a computer. In one embodiment, Alice's IM client device will open one message viewing window, e.g., the pop-up window 900 depicted in FIG. 9, for each sender that has messages buffered in the IM server. After sending buffered messages to the client device, the server application remains idle in a message receive mode. Returning to step 220, if the received request is a request that the IM server buffer a message, e.g., in database 26, then at step 222, the IM server initiates functionality for storing, i.e., buffering the messages from the user (Alice). Details regarding the message buffering step 222 are described in further detail herein with respect to FIG. 4. For instance, as will be described in greater detail herein, it is understood that the IM server has ensured that the privileges associated with buffering of messages in the IM storage database for a particular user (e.g., Alice) had been previously granted. After saving buffered messages in the storage database 26 of the IM server, the server application remains idle in a message receive mode. Finally, returning to step 230, if the received request is a request from a user to disconnect from the IM server system, the system will process the disconnect request and further indicated that the user, e.g., Alice, has logged off the IM system at step 232. Thereafter, the server application remains idle in a message receive mode.

Figure 4:
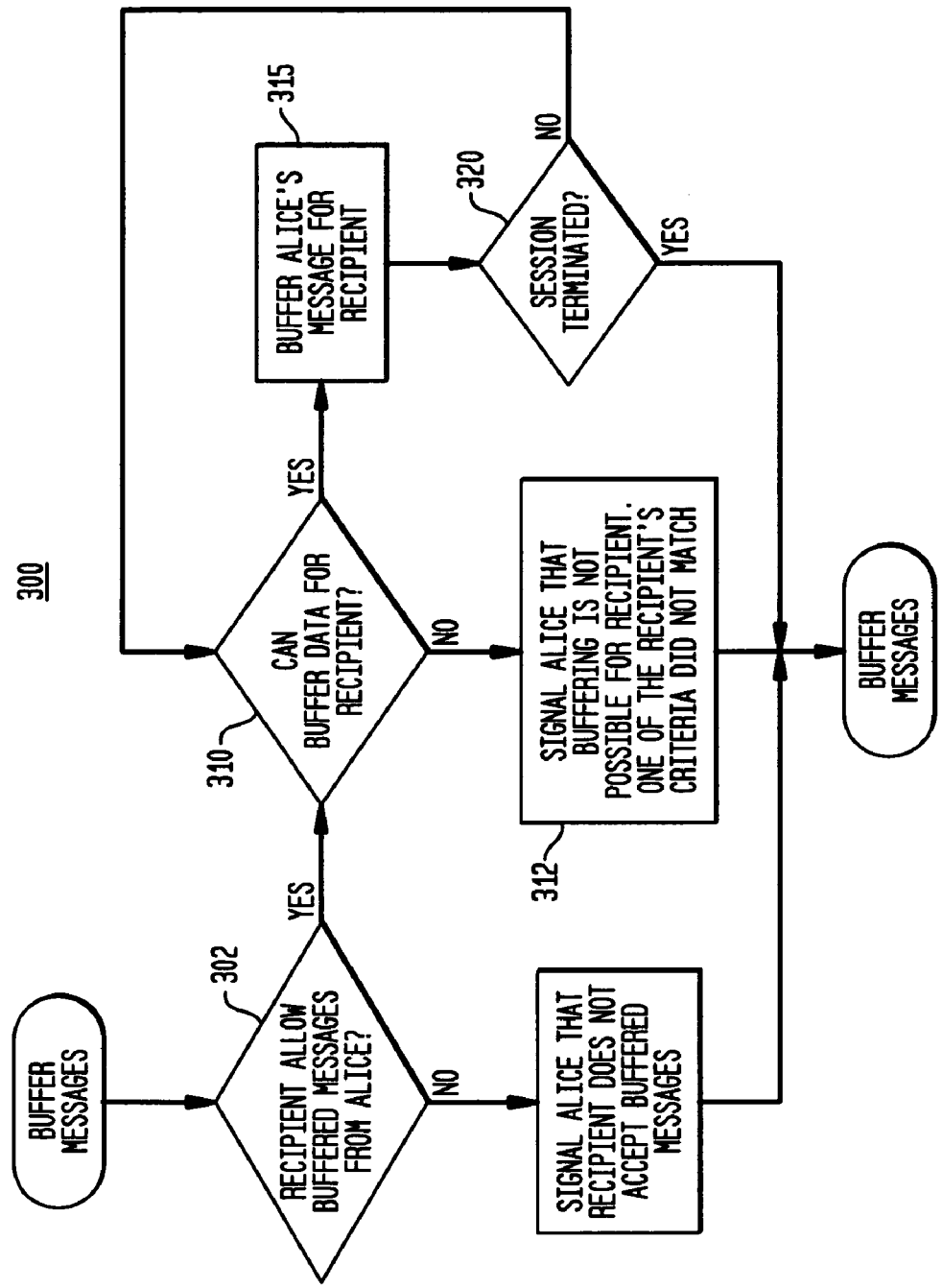
FIG. 4 illustrates the flow process 300 for buffering messages within the IM system supporting IM service in disconnected modes according to the invention.

FIG. 4 illustrates the flow process 300 for buffering messages within the IM system supporting IM service in disconnected modes according to the invention. This is a detailed flow process of step 222 described with respect to FIG. 3. In FIG. 4, at a first step 302, a determination is made as to whether an intended recipient, i.e., an IM system user, has agreed to allow receipt of buffered messages from the sender Alice. If a determination is made at step 302 that the intended recipient had not agreed to allow buffered messages, the process will proceed to step 305 where functionality is executed to indicate to Alice that the intended recipient does not accept buffered messages. Otherwise, if at step 302 the intended recipient had agreed to allow storage/buffering of IM messages in the database 26 (FIG. 1), the process will proceed to step 310 where functionality is executed to determine whether the IM server application can buffer message data for the recipient. If at step 310 it is determined that the IM server application can not buffer message data for the recipient, e.g., due to the inability to satisfy one or more of the recipient's preference criteria, then the process proceeds to step 312 where the sender, e.g., Alice, is notified that buffering is not possible for the recipient. That is, as will be explained in greater detail herein, one way of determining potential ability to accept messages for recipients is the application of certain user preference criteria, which, if matched, will either enable or prevent the buffering of messages. Thus, even if the intended recipient does allow the buffering of messages, if one or more recipient preference criteria does not match, then that message may not be buffered for the recipient. Returning to step 310, if it is determined that the IM server application can buffer message data for the recipient, then the process proceeds to step 315 where the sender Alice's message is buffered for the recipient, i.e., stored in the message buffer database 26 for the recipient's later retrieval. Then, proceeding to step 320, a determination is made as to whether the session is to be terminated. If the session is to be terminated, then the process returns to the server application, or otherwise, returns to step 310 to determine whether more data may be buffered for the recipient.

Figure 5:
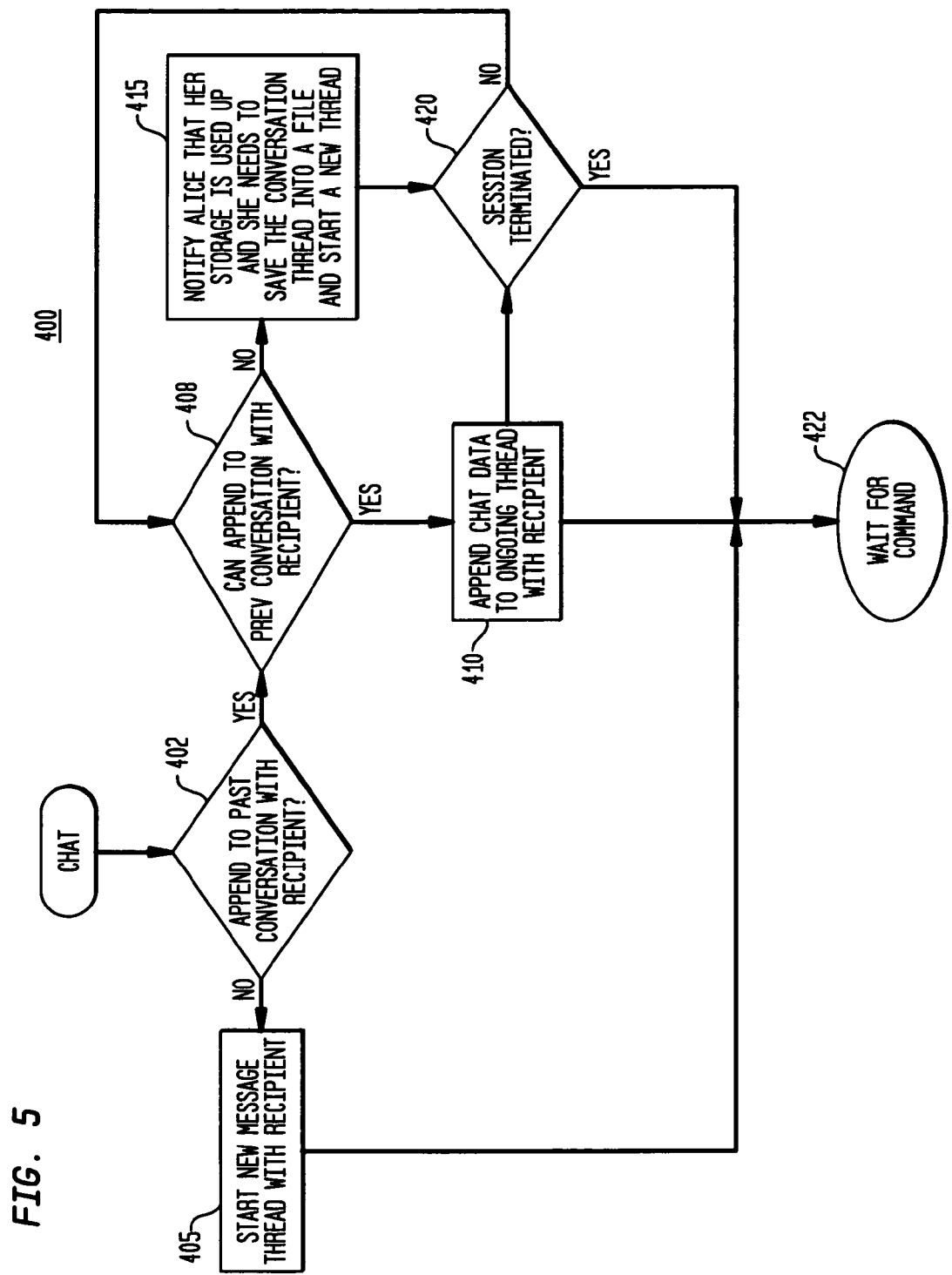
FIG. 5 illustrates an embodiment for conducting IM chat between users in disconnected mode according to another aspect of the invention.

FIG. 5 illustrates an embodiment for conducting IM chat 400 between users in disconnected mode according to another aspect of the invention. This is a detailed flow process of step 122 described with respect to FIG. 2. According to this feature, messages may be appended to prior messages, thus, obviating the need to restart a message thread each time two users conduct a IM message chat. As shown in FIG. 5, the chat functionality according to the invention includes a first step 402 of determining whether a sender desires to append a current message to a past conversation with an intended recipient. If the sender user does not wish to append a chat message to a past conversation with the intended recipient, then as indicated at step 405, a new message thread is started with the recipient. A chat may subsequently be conducted according to known techniques. If, at step 402, it is determined that the sender user does wish to append a current chat message to a past conversation with the sender, then the process proceeds to step 408 where a determination is made as to whether a past conversation had already been initiated between the sender and recipient parties. If a past conversation with the recipient had already been initiated, then the process proceeds to step 410 where the chat data is appended to the ongoing thread with the recipient. All buffering of the message chat thread in disconnected mode is stored at the IM server. The process then proceeds to step 420 to determine whether Alice's session with the disconnected recipient is to be terminated. If the answer is "Yes" in step 420, Alice's chat process with the recipient is ended and program control flows to step 422 where the IM application is waiting for a user or system command. Otherwise the process flow returns to step 408. Returning back to step 408, if it is determined that the current chat message can not be appended with a prior conversation thread with that recipient, then the process proceeds to step 415 where a notification message is sent to the sender that her storage is used up and that the user needs to save the conversation thread into a file. Thereafter, a new thread may be started. The process then proceeds to step 420 to determine whether Alice's session with the recipient is to be terminated. If the answer is "No" in step 420, the process flow returns to step 408. The IM system supporting chat in disconnected modes may also be enhanced to transfer to the memory storage device 26 on the IM server (FIG. 1) the contents of the conversation thread 910 in FIG. 9 of a current IM pop-up window, so that context is not lost each time the user logs out of the IM system.

Further features of the IM system supporting disconnected modes includes the feature of providing the system with a mechanism to indicate to the sender when the intended recipient was last seen on the IM system. Optionally, the system may further keep a log of past conversations so that the participants can look at the text message data as one long conversation stream. How to implement such a log is well known to anyone skilled in the art of database programming.

The semantics of when the IM system of the invention permits received messages to be buffered, user interface issues, storage for buffering, maximum time windows for buffering messages at the IM server, etc., may be specified by the user although default values are provided by the system. FIG. 6 illustrates example IM preference criteria, shown in table form 600, which is indicated by users of the IM system of the invention. These preference criteria are referred to by the IM server processor as part of the determination for preventing/allowing buffering of IM messages for an intended recipient/user, e.g., Alice. These preferences are input to the IM system by a user when that user subscribes to the system, however, it is understood that message delivery preferences may be changed at any time. The message delivery preferences are stored at the IM server/database, for profile preference database 27 shown in FIG. 1, and are implemented by the server when message buffering requests are received. The system thus provides an interface display that provides users (senders/recipients) with an option to permit only certain members of the community to send buffered messages so that users will not get swamped with buffered messages.

As indicated herein with respect to step 302 of FIG. 4, for example, when the IM server receives a request to buffer an IM message for an intended recipient, the IM server application of the invention will, in a first instance, check to see if the intended recipient has indicated a preference to buffer messages from the requesting IM sender and, whether the sender and the message meets other preference criteria. The IM server may perform this task by referring to the preference criteria information from the storage database 27, and particularly the entry 602 of whether that recipient has permitted the buffering of messages in the first instance from a particular sender. It is optionally contemplated that a user may indicate a preference that buffered messages are to be delivered only when both the user and the sender are online. The user preference will be indicated to the sender at the time the sender sends the message for buffering. This preference limits the opportunity for playing "IM-tag" (using an analogy from phone-tag).

Thus, in the example provided by way of the table 600 shown in FIG. 6, a recipient user, e.g., Alice, has indicated preferences 602 to only receive and buffer messages from specific senders, e.g., Bob, Suzy, Chet and Katy. As further illustrated in the preference criteria table 600, Alice has indicated a preference not to permit messages from the sender Charlie to be buffered.

According to the preference criteria used in the determination of whether to permit messages to be buffered, a user may additionally choose to permit only a specified number of messages to be buffered. If the number of buffered messages reaches that limit, the server will ensure that senders will no longer be allowed to send buffered messages. The user may additionally specify a time limit for which messages are to be buffered at the IM server. Clearly, the value of a buffered message may diminish with time and therefore, the user may for example select that buffered messages be discarded after the time limit expires. Further, the system/user may set a limit to the amount of storage allowed on the server for each user for buffered messages. If the limit is reached, senders will no longer be allowed to send buffered messages to the recipient. Thus, as shown in the example preferences criteria table 600 of FIG. 6, Alice has indicated a buffering quota preference that indicates to the IM system: 1) how many messages 604 will Alice prefer to receive from preferred senders; and/or 2) how much memory 606 will be allocated for Alice to receive messages from specific senders; and 3) the acceptable times 608 that the message buffering quota is enforced for specific senders. For example, as shown in the table representation 600 of FIG. 6, Alice prefers to allocate 20 Mbytes of buffer message storage for messages received from Chet between the hours of 8:00 a.m. to 5:00 p.m. however, will only accept 2 MB amount of storage for messages received from Chet after 5:00 p.m. It is further understood that the user, e.g., Alice, may further indicate time duration that the buffered messages will be available for that user's access. Thus, the user may indicate a preferred delivery time for messages that have been buffered. If the recipient, e.g., Alice, has not read her messages in the indicated time, then those messages will be removed by the IM server message storage device. For example, as indicated by the table 600 shown in FIG. 6, the user Alice has indicated preference for receiving buffered messages from user Bob only between the hours of 9:00 a.m. to 6:00 p.m. after which time those message will no longer be deliverable to Alice. It is contemplated that when messages are to be removed from the system, the IM server may optionally indicate to the sender that the recipient did not receive the buffered message and, for instance, may initiate an e-mail that includes the buffered message to the intended recipient.

Figure 7:
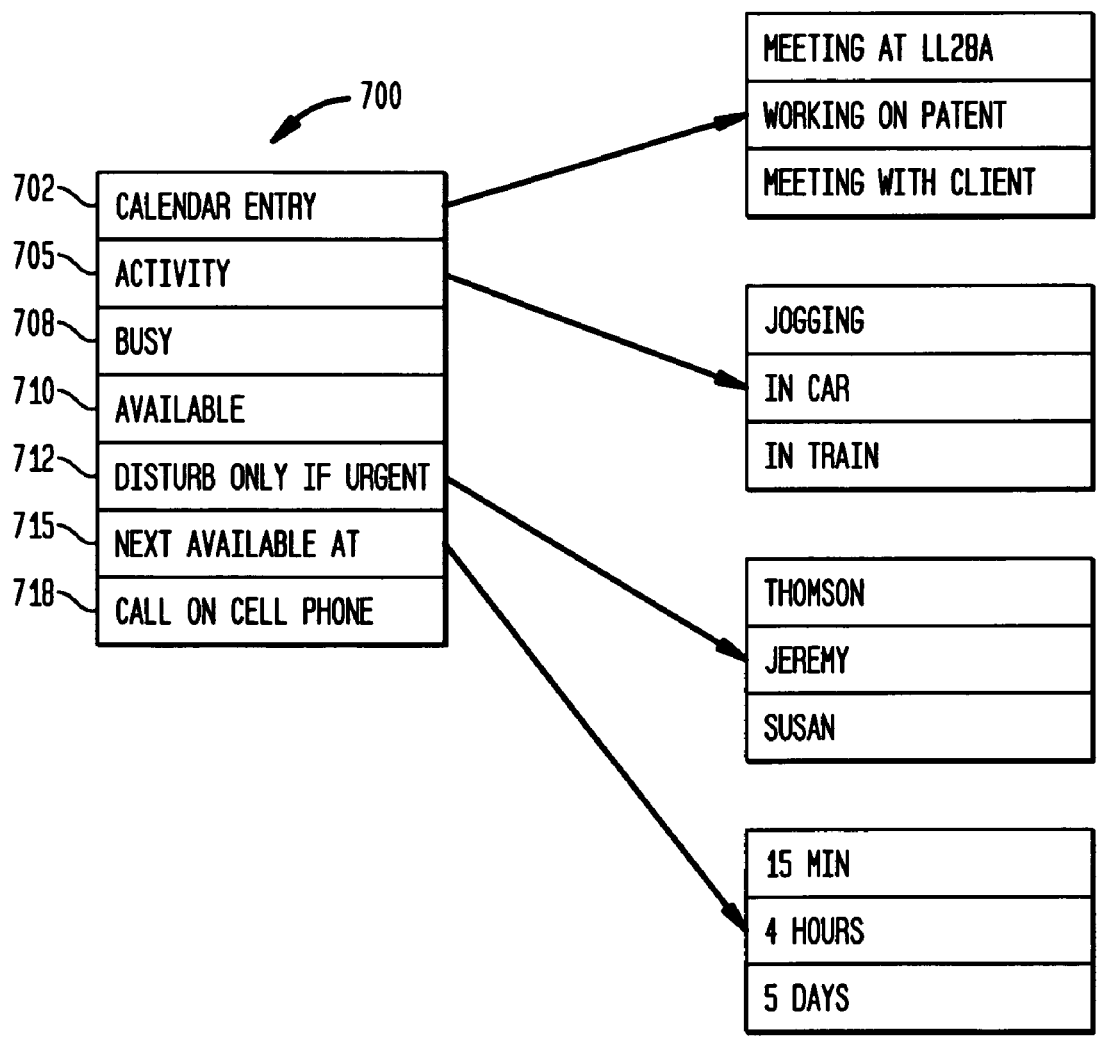
FIG. 7 illustrates IM user status criteria that is indicated by disconnected users of the IM system of the invention.

FIG. 7 illustrates user status criteria 700 that are indicated by users of the IM system of the invention, e.g., prior to their becoming disconnected (off-line). These status criteria are input to the IM server of the invention and stored in the preference database 27 (of FIG. 1). Details regarding a disconnected user's status may be displayed to potential senders of IM messages to provide them with the relevant information regarding a recipient's disconnected status. As shown in FIG. 7, such a disconnected status may include, but is not limited to, the following entries: the indication of a calendar 702, e.g., Alice's whereabouts at a particular moment, such as, being at a client meeting; the indication of a disconnected user's activity 705, e.g., Alice is jogging; the indication of whether a disconnected user is busy or not 708; the indication of whether a disconnected user is available or not 710; the indication of whether the disconnected user may be disturbed or not if a message is urgent 712; the indication of when the disconnected user will be available 715; and, the indication of whether the disconnected user is available to receive a call on that user's cell phone 718.

These status indicators are input to the IM system by a user when that user becomes disconnected, e.g., location, activity, etc. or, when that user's status has changed. The user may specify default disconnected status indicators that do not change which may be useful at certain times, e.g., at lunch, or when the user leaves work for the day. In the preferred embodiment, the status indicators are input to the IM system by a user when that user becomes disconnected and are made available to potential chat participants. It is understood that not all participants are allowed to view the connection of the user nor are allowed to any queries about the user they may submit to the IM server. The user ensures this by establishing a list of buddies, herein referred to as the access control list that is described herein with respect to FIG. 8. The buddies may be put into different categories that gives them different privileges. After all, most users, when they disconnect, do it to not be disturbed. Thus, only really urgent messages are able to reach the users.

For instance, FIG. 8 illustrates an example IM access control list 800 describing what user disconnect status information recipients can see. The access control list is input to the IM system of the invention by users and may be presented for display to other users of the system. The access control list is stored at the IM server database 27 (FIG. 1) and is referred to by the server when message buffering requests are received for potential user recipients. Particularly, when a server receives a request from a sender to buffer an IM message for an intended recipient, the IM server application of the invention may first check the access control list to determine whether the intended recipient has indicated a preference to reveal to that requester the disconnect status of that disconnected recipient. In the example provided by way of the list 800 shown in FIG. 8, a user Alice has indicated access control list preferences that indicate to the system what status information particular users may be shown. For example, the table 800 shown in FIG. 8 illustrate that the user Alice has indicated preferences that the IM system reveal her current location to specific senders, e.g., Bob, Suzy, Chet and Katy, but that she is only amenable for receiving calls on her cell phone from Bob if a message sent by him should fail. As further illustrated in the table 800 of FIG. 8, Alice has indicated a preference not to provide Charlie and Suzy with her calendar access information, but rather, reveal to these users what activity she is currently engaging in (i.e., physical activity access).

In another example scenario, it may be the case that a user becomes disconnected from the IM server by accident. For example, if a user is using a wireless network card and the user moves out of reach of the wireless access point, then the user will suddenly loose network connection and the user will not be able to communicate with the IM server. In the preferred embodiment, this type of network disconnect does not cause the IM application running on the user's computer nor the session with the IM server to be terminated. Rather the session with the IM server is kept alive for a user specified time. IBM's Lotus Sametime® IM software already has this capability except it is not configurable. When the IM server determines that it has lost logical connectivity with a user, it may indicate this status change of the user by dimming or graying the last known status indicator in FIG. 7. Alternatively, the user may configure the IM server to show a status indicator that reads "disconnected from network."

Another feature of the system and method of the present invention is the provision of functionality to enable the user to start a virtual IM session with a recipient even though the user can not reach the IM server. This will allow for the user to start such a session and enter messages to the recipient so that once the users reconnect to the network and to the IM server, the accumulated messages in the conversation field 910 in FIG. 9 are automatically sent to the IM server. In this fashion, the user does not have to wait to be reconnected which may cause the user to forget what he/she wanted to tell the recipient.

Another feature of the system and method of the present invention is the provision for the IM server to provide functionality such that messages from a first party to a second party are routed to a third party, and where third party has been registered at the IM server as a proxy party for second party to receive second party's messages, or at least be notified about the messages. One benefit of this feature is that the third party can be used to get hold of, or alert, a disconnected second party about buffered messages for the second party. Another usage of this feature is to use the proxy party as a secretary/administrator interface so that even though second party is connected to the IM service, a first party would be communicating with second party's secretary/administrator, i.e., the proxy party. Yet another usage of the proxy party is to use the proxy party to notify the second party to connect to the IM service.

The configuration tables in FIG. 7 and FIG. 8 can be extended to encompass the above proxy feature. In FIG. 7 this can be accomplished by including an "Proxy" option in the table. In FIG. 8 this can be accomplished by adding a "Proxy" column in the table where a "Y" means that a certain user can communicate with Alice's proxy party and where a "N" means that a user may communicate directly with Alice.

The features of the present invention are readily implementable for extending current IM systems such as International Business Machine's (IBM) Lotus Instant Messaging and Web Conferencing—also known as Sametime® which is IBM's market-leading product and platform for real-time collaboration. The present invention improves the value of collaborative technologies such as provided by IBM Lotus suite of products.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for enabling messaging between disconnected parties in an instant messaging (IM) system, said method comprising the steps of:

receiving at a computing device at least one message sent by a first party, said at least one message destined for a second party, said computing device maintaining, for a second party, preference criteria specifying an amount of messages sent by said first party that are to be buffered for said second party;

determining connection status of said second party with said IM system and, if determination is that said second party is disconnected from said IM system, a step of determining, at said computer device, whether said at least one message sent by a first party exceeds said specified amount of messages received from said first party that may be buffered for said second party according to said preference criteria; and if said message does not exceed said specified amount of messages, storing said at least one message received by said first party;

determining, at said computing device, when said second party becomes connected to said IM system; and, notifying said second party of availability of said stored at least one message; and saving a prior IM message chat conversation thread between said first and said second parties; and, appending the received message from the first party to said saved prior message chat conversation thread for presentation to said second party via a chat interface, wherein some context of a prior IM message chat between said first and second parties is preserved; and, providing a chat interface on second party's computing device, said chat interface being specific to said first party and said chat interface including said saved prior message chat conversation thread and said appended message received from said first party.

2. The method for enabling messaging according to claim 1, further comprising the step of initiating real-time IM chat between said first and said second parties via said chat interface if said first party and second party is connected.

3. The method for enabling messaging according to claim 1, further comprising:

maintaining, for said second party, preference criteria specifying a time duration in which messages received from said first party may be buffered for said second party; and, storing, for said second party, said at least one message;

wherein after said second party becomes connected to said IM system, determining, at said computer device, whether said at least one message from said first party has exceeded said time duration specified for buffering said received messages from said first party according to said preference criteria, and if said time duration has not been exceeded, notifying said second party of availability of said stored at least one message.

4. The method for enabling messaging according to claim 3, further including the steps of:

automatically removing messages that have been buffered if the second party has not accessed buffered messages in said specified time duration.

5. The method for enabling messaging according to claim 1, further comprising:

maintaining, for said second party, preference criteria specifying an amount of memory storage allocated for buffering messages received from said first party; and, determining prior to storing a received message received from said first party, whether an amount of memory storage allocated for buffering messages from said first party will be exceeded; and storing, for said second party, said at least one message if said allocated memory storage amount is not exceeded.

6. The method for enabling messaging according to claim 1, further comprising:

maintaining, for said second party, preference criteria specifying whether or not a second party's disconnected status is to be indicated to said first party, and determining, in response to receiving said at least one message from said first party, whether or not the second party's disconnected status is to be indicated to said first party and one of: providing indication for said first party, a disconnected status of said second party if specified by said preference criteria; or not providing said indication to said first party.

7. The method for enabling messaging according to claim 6, wherein said maintained preference criteria indicating said second party's disconnected status includes one or more selected from the group comprising: an indication of a disconnected second party's location at a particular moment, the indication of a disconnected second party's activity, the indication of whether a disconnected second party is busy or not busy, and, the indication of whether a disconnected second party is available or not for receiving a communication via another communications system and when the disconnected second party will be available for receiving messages.

8. The method for enabling messaging according to claim 6, wherein said maintained preference criteria indicating said second party's disconnected status includes an indication of a disconnected second party's preference for receiving an urgent communication from said first party.

9. The method for enabling messaging according to claim 1, further including a step of enabling a disconnected second party to register a third party adapted to receive notifications about a first party's messages for said disconnected second party.

10. A system for providing instant messaging (IM) functionality in disconnected mode comprising:

a communications device for receiving and forwarding IM messages between an IM sender application and an IM recipient application;

means associated with said communications device for storing received sender messages destined for said recipient application when a recipient is disconnected from said IM system;

means implemented at said communications device for maintaining preference criteria specifying an amount of messages sent by said IM sender that are to be buffered for said IM recipient; and, a processing means, associated with said communications device, for determining whether an amount of messages received from said IM sender that may be stored for later access by said IM recipient has exceeded said specified amount of messages received from said IM sender that may be buffered for said IM recipient according to said preference criteria; and if a received message from said IM sender does not exceed said specified amount of messages, storing said at least one message received by said IM sender; and, said processing means initiating saving of a prior IM chat conversation thread between said IM sender and said IM recipient in said storage device, and, appends the received message from the IM sender to said saved IM chat conversation thread for presentation to said IM recipient via a chat interface, wherein context of an IM chat between said IM sender and said IM recipient is preserved; and, means for providing a chat interface on a IM recipient's computing device, said chat interface being specific to said IM sender and said chat interface including said saved prior message chat conversation thread and said appended message received from said IM sender.

11. The IM system according to claim 10, further comprising means for generating a chat interface on a recipient computing device, said chat interface appearing after said recipient device connects to said IM system and including said stored sender messages, said chat interface further supporting real-tine chat with said sender if said sender is connected to said IM system.

12. The IM system according to claim 10, wherein preference criteria further specifies a time duration in which messages received from said IM sender may be buffered for said IM recipient, wherein after said IM recipient becomes connected to said IM system, said processing means determining whether said at least one message from said IM sender has exceeded said time duration specified for buffering said received messages from said IM sender according to said preference criteria whether a message from said IM sender has been received within a time duration specified for receiving messages from said IM sender and, if said time duration has not been exceeded, notifying said IM recipient of availability of said stored at least one message.

13. The IM system according to claim 12, wherein said processing means automatically removes messages that have been buffered if the IM recipient has not accessed buffered messages in said specified time duration.

14. The IM system according to claim 10, wherein said preference criteria further specifies an amount of memory storage allocated for buffering messages received from said IM sender; wherein prior to storing a received message from said IM Sender, determining, whether an amount of memory storage allocated for buffering messages from said IM sender will be exceeded; and, storing, for said IM recipient, said at least one received message if said allocated memory storage amount is not exceeded.

15. The IM system according to claim 10, wherein said preference criteria further specifies whether or not an IM recipient's disconnected status is to be indicated to said IM sender, said processing means determining, in response to receiving said at least one message from said IM sender, whether or not the IM recipient's disconnected status is to be indicated to said IM sender and one of: providing indication for said IM sender, a disconnected status of said second party if specified by said preference criteria; or not providing said indication to said IM sender.

16. The IM system according to claim 15, wherein said maintained preference criteria indicating an IM recipient's disconnected status includes one or more selected from the group comprising: an indication of a disconnected IM recipient's location at a particular moment, the indication of a disconnected IM recipient's activity, the indication of whether a disconnected IM recipient is busy or not busy, and, the indication of whether a disconnected IM recipient is available or not for receiving a communication via another communications system and when the disconnected IM recipient will be available for receiving IM messages.

17. The IM system according to claim 15, wherein said maintained preference criteria indicating an IM recipient's disconnected status includes an indication of a disconnected IM recipient's preference for receiving an urgent communication from a potential IM sender.

18. An article of manufacture comprising:
at least one computer usable medium having a computer readable program code logic to execute a machine instruction in a processing unit for providing instant messaging (IM) capability between disconnected parties in an IM system, said computer readable program code logic, when executing, performing the following steps:
receiving at a computing device at least one message sent by a first party, said at least one message destined for a second party, said computing device maintaining, for a second party, preference criteria specifying an amount of messages sent by said first party that are to be buffered for said second party;
determining connection status of said second party with said IM system and, if determination is that said second party is disconnected from said IM system, a step of determining, at said computer device, whether said at least one message sent by a first party exceeds said specified amount of messages received from said first party that may be buffered for said second party according to said preference criteria; and if said message does not exceed said specified amount of messages, storing said at least one message received by said first party;
determining, at said computing device, when said second party becomes connected to said IM system; and, notifying said second party of availability of said stored at least one message; and
saving a prior IM message chat conversation thread between said first and said second parties; and,
appending the received message from the first party to said saved prior message chat conversation thread for presentation to said second party via said chat interface, wherein some context of a prior IM message chat between said first and second parties is preserved; and,
providing a chat interface on second party's computing device, said chat interface being specific to said first party and said chat interface including said saved prior message chat conversation thread and said appended message received from said first party.

19. The computer program product according to claim 18, further comprising the step of initiating real-time IM chat between said first and said second parties via said chat interface if said first party and second party is connected.

20. The article of manufacture according to claim 18, further comprising:
maintaining, for said second party, preference criteria specifying a time duration in which messages received from said first party may be buffered for said second party; and,
storing, for said second party, said at least one message; wherein after said second party becomes connected to said IM system, determining, at said computer device, whether said at least one message from said first party has exceeded said time duration specified for buffering said received messages from said first party according to said preference criteria, and
if said time duration has not been exceeded, notifying said second party of availability of said stored at least one message.

21. The article of manufacture according to claim 18, further comprising:
maintaining, for said second party, preference criteria specifying an amount of memory storage allocated for buffering messages received from said first party; and,
determining prior to storing a received message received from said first party, whether an amount of memory storage allocated for buffering messages from said first party will be exceeded; and
storing, for said second party, said at least one message if said allocated memory storage amount is not exceeded.

22. The article of manufacture according to claim 18, further comprising:
maintaining, for said second party, preference criteria specifying whether or not a second party's disconnected status is to be indicated to said first party, and
determining, in response to receiving said at least one message from said first party, whether or not the second party's disconnected status is to be indicated to said first party and one of: providing indication for said first party, a disconnected status of said second party if specified by said preference criteria; or not providing said indication to said first party.

23. The article of manufacture according to claim 22, wherein said maintained preference criteria indicating said second party's disconnected status includes one or more selected from the group comprising: an indication of a disconnected second party's location at a particular moment, the indication of a disconnected second party's activity, the indication of whether a disconnected second party is busy or not busy, and, the indication of whether a disconnected second party is available or not for receiving a communication via another communications system and when the disconnected second party will be available for receiving messages.

24. The article of manufacture according to claim 22, wherein said maintained preference criteria indicating said second party's disconnected status includes an indication of a disconnected second party's preference for receiving an urgent communication from said first party.

25. The article of manufacture according to claim 18, further including the steps of:
   automatically removing messages that have been buffered if the second party has not accessed buffered messages in said specified time duration.

26. The article of manufacture according to claim 18, further including a step of enabling a disconnected second party to register a third party adapted to receive notifications about a first party's messages for said disconnected second party.

* * * * *